United States Patent [19]

Fournet

[11] 4,234,789
[45] Nov. 18, 1980

[54] OBSERVATION OPTICAL APPARATUS

[75] Inventor: Maurice Fournet, Meudon, France

[73] Assignee: Organisation Europeenne de Recherches Spatiales, Paris, France

[21] Appl. No.: 927,532

[22] Filed: Jul. 24, 1978

[30] Foreign Application Priority Data

Aug. 2, 1977 [BE] Belgium ................ 0179836

[51] Int. Cl.$^3$ .................................. H01J 3/14
[52] U.S. Cl. ................................ 250/234; 250/334
[58] Field of Search ............... 290/201, 203, 216, 226, 290/208, 209, 334, 347, 234, 235, , 236

[56] References Cited

U.S. PATENT DOCUMENTS

| 3,883,437 | 5/1975 | Nummedal et al. | 250/334 |
| 3,886,359 | 5/1975 | Cheek et al. | 250/347 |
| 4,054,797 | 10/1977 | Milton et al. | 250/334 |

*Primary Examiner*—David C. Nelms
*Attorney, Agent, or Firm*—Spencer & Kaye

[57] ABSTRACT

An improved optical observation system for a movable body in space which comprises a scanning mirror, imaging optics and a sensor formed by at least one array of photodetectors arranged along a plurality of rows parallel to the apparent displacement of the image points. The electric signals from the photodetectors are driven to be transferred from one photodetector to the following along each row with a velocity equal to the velocity of the apparent displacement of the image points. An advantageous embodiment for the sensor is also disclosed together with suitable means for multiplexing the output signals developed at the ends of the rows onto a unique output line.

3 Claims, 4 Drawing Figures

OBSERVATION OPTICAL APPARATUS

FIELD OF THE INVENTION

The present invention relates to an optical system for a movable body in space such as an aircraft or a spacecraft, for the observation of the Earth from an overhead position.

Known observation systems are limited in performance due to technological constraints and to operating conditions such as the high velocity of the carrying bodies.

The known types of such optical system have features compounded to achieve some compromise or other between the following four main characteristics:

(1) the spectral resolution i.e. the number of independent spectral channels within a given spectral band width;

(2) the geometrical resolution measured as the inverse of the minimum dimension which is distinguishable on the Earth;

(3) the radiometric resolution i.e. the signal-to-noise ratio of the individual measurement of each image element for each spectral channel;

(4) the maximum angular value for the transverse field of the apparatus.

A first known type of observation system uses conventional camera apparatus in which a bidimensional image of the viewed scene is instantaneously formed. The coverage of the mission is formed by a sequence of such images, with or without overlapping. These systems which involve a photographic or TV camera process have the following drawbacks;

(a) the very low practical utilization of the exposure time theoretically available during the flying over and consequently the alternate limitation of the spectral resolution or the radiometric resolution;

(b) the difficulty of strictly superimposing several synchronous images obtained with extended and necessarily distinct pieces of apparatus which are working within different spectral channels;

(c) the practical limitation of the geometrical resolution due to the generally great value of the required angular field;

(d) the practical limitation of the angular aperture of the telescope which must have a certain field and a certain resolution; this limitation in turn causes the sensitivity to be limited.

A second type of system is the multispectral scanner system. This system comprises a scanning mirror arranged for reflecting the incident radiation toward a telescope, this mirror being mounted to be rotated periodically such that the pointing axis is displaced for covering the width of the required transverse field. A plurality of substantially pin-point photodetectors are placed in the image plane of the telescope for generating electric signals proportional to the irradiance with each detector being associated with a distinct spectral channel.

An improvement to this type of observation system consists in placing in each channel a plurality of detectors instead of one, aligned to form a strip extending perpendicular to the scanning lines. This improvement permits, by scanning several lines at a time, reduction of the scanning speed of the mirror and thereby an increase in the exposure time of each image element in each channel.

This type of sensor permits a high geometrical resolution to be obtained in a wide angular field together with detection synchronism of the different spectral luminances of an element of the viewed scene. Its major drawbacks are inferior utilization of the theoretically available luminous energies and an alternate limitation of the spectral or radiometric resolution.

A third type of observation system is the so-called push-broom imaging sensor. This sensor comprises a linear photodetector placed perpendicular to the along-track direction to permit the simultaneous exposure of an entire coverage line. This linear detector usually comprises a charge-coupled denise (CCD) which permits fast and sequential reading of the different line segments through a unique electric signal channel by means of an alternate exposure-reading cycle. This type of sensor permits good utilization of the incident irradiance energies due to the plurality of sensitive elements that is (each element is detected during the entire duration of the flight).

This type of sensor has the following drawbacks:

(a) the existence of a compromise between the geometric resolution, the angular extension of the transverse coverage and the telescope angular aperture, as with the camera system. This constraint is due to the rules which govern the construction of camera type optical systems and results in the limitation to about 3000 of the number of resolvable elements in the same line. In such an optical system the geometrical resolution is thus sacrificed to the width of the viewed band or restricts the latter to achieve a high resolution;

(b) the occurrence of inhomogeneities in gain and noise of the different detector elements along a line, which inhomogeneities require a signal pretreatment and a complex calibration.

In a known improvement there is provided a plurality of parallel and adjacent rows of detector elements instead of one, said rows being arranged such that the detection elements of the same order in each row, aligned along a direction perpendicular to that of these rows, are charge coupled at a speed which is adjusted to that of the apparent movement of point in the image plane. The signals produced by these aligned corresponding detector elements are thereby accumulated during their passing the successive rows. This system has an increased sensitivity but its application is limited for it does not avoid the tradeoff between the geometrical resolution and the transverse extension of the coverage. In addition, this improved system does not permit observation of thermal IR radiation and it raises the problem of the residual faults in the yaw control of the carrying body.

SUMMARY OF THE INVENTION

A first object of the invention is to provide an optical observation system which avoids the problem presented by the above mentioned tradeoff.

Another object of the invention is providing an optical observation system in which the mentioned major characteristics are significantly improved and in which particularly a high sensitivity is combined with a high geometrical resolution.

Yet another object of the invention is providing an optical observation system having a sensitivity with a high spatial homogeneity which enables a redundant number of narrow spectral channels to be used for various applications in the visible and near IR spectra, and which in addition allows an easy integration of means for permitting the system to work in the medium and thermal IR spectra with the usual sensitivity conditions.

In accordance with the invention there is provided an optical observation system for a movable body in space comprising multichannel optical means having a narrow angular field; scanning mirror means for reflecting the incident radiation from a scene towards the optical means, the scanning mirror means being arranged to rotate at a predetermined speed about a spin axis extending transversally to the plane of the scanning mirror means such that each image point in the image plane of the optical means has an apparent displacement in a direction transverse to the direction of movement of the movable body. In the image plane there is provided sensor means for generating electric signals proportional to the irradiance, the sensor means comprising, for each spectral channel, an array of photodetector elements arranged along a plurality of detection lines extending parallel to the direction of the apparent displacement of an image point in the image plane. The photodetector elements in each line are driven such that the electric signal is transferred from each of them to the following at a speed equal to the speed of the apparent displacement of the image point in the image plane.

DESCRIPTION OF THE DRAWINGS

Referring to FIG. 1 of the drawings there is schematically shown in exploded and perspective view an observation system 10 in accordance with the invention mounted together with associated control equipment (not shown) on board a spacecraft or an aircraft (not shown) which is flying over the Earth, an area of which is shown and designated as T. The arrow V indicates the direction of motion of the carrying body.

Figure 1:
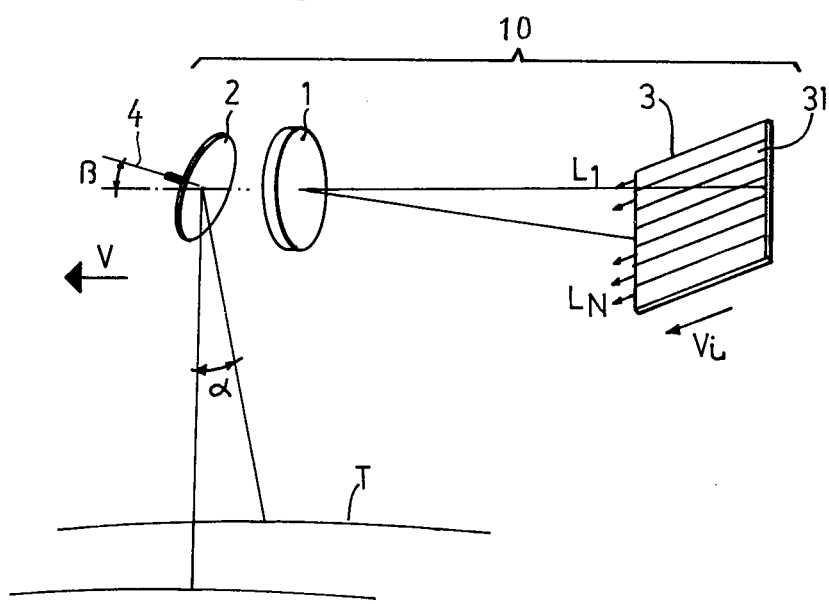
FIG. 1 is a diagrammatic illustration of the observation system according to the invention.

The system 10 comprises optical means 1 having a small angular field, a scanning mirror 2 placed for reflecting the incident radiation from the Earth toward the optical means 1, and sensor means 3 located in the image plane of the optics 1.

The optical means has suitable means associated therewith for producing a plurality of physically separate image channels with distinct spectral bands.

The scanning mirror 2 is mounted on a spin axis 4 which extends transversally to the plane thereof. The spin axis 4 may be parallel with the direction of movement of the carrying body. In the illustrative embodiment as depicted in FIG. 1 the mirror spin axis 4 is inclined at an angle $\beta$ with the direction of movement V. Mechanical driving means (not shown) drive the mirror 2 to rotate periodically at a predetermined speed about axis 4 thereby assuring that the desired angular coverge $\alpha$ in direction transverse to the direction of movement of the carrying body is obtained. Such scanning causes each image point to have a transverse apparent displacement in the image plane. The arrow Vi indicates the direction of said apparent displacement.

The sensor means 3 comprises an array of photodetector elements arranged along a plurality of detection lines 31 extending parallel with the direction of the apparent displacement of the image points. This direction can advantageously be arranged to be perpendicular to the image of the along-track direction of the carrying body projected onto the earth's surface. For that purpose the spin axis 4 of the scanning mirror is inclined at an angle in the horizontal plane relative to the direction of movement of the carrying body, the angle being a function of the speed of motion of the body and of the scanning speed. Each detector element is comprised of a device arranged to generate an electric signal in response to being irradiated by an imaging beam. Suitable driving means are associated with the detector elements for transferring the detector output signal from each detector element to the following one along each detection line 31 at a speed equal to the speed of the apparent displacement of the image point. The output signal from each detector element thereby adds to the signal which is developed by accumulation on the preceding element in each line and at the end of each such detection line there appears an integrated signal which needs only to be read out by means of suitable reading means, known per se.

Each detection line is advantageously comprised of a CCD, a device known per se, connected to suitable driving means for control of the charge transfer.

Figure 2:
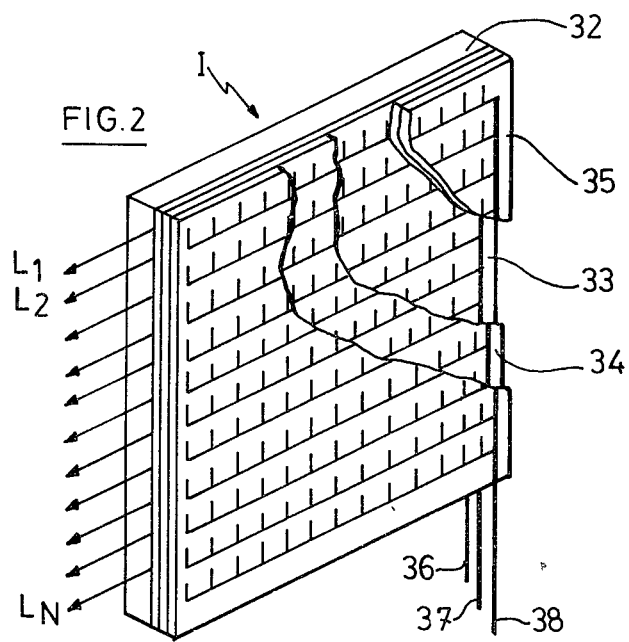
FIG. 2 is a pictorial illustration of one embodiment of the sensor means in accordance with the invention.
Figure 3:
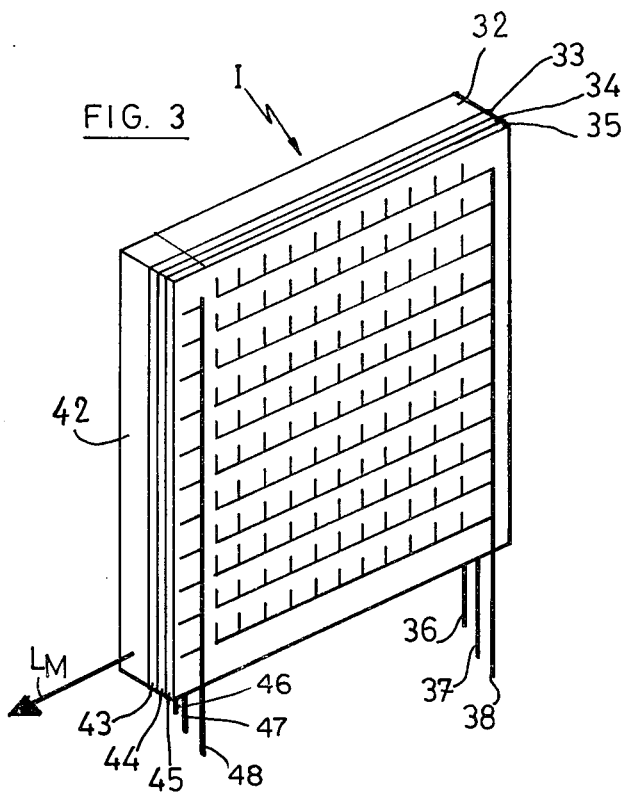
FIG. 3 depicts a variation of the embodiment of FIG. 2.

FIG. 2 depicts an exemplary embodiment of the sensor means 3 as arranged for 3-phase driving. The number of phases may obviously be higher than three. The CCD's are arranged to form a plate 32 having one face placed for impingment thereon by the incident radiation I from the optical means 1. Onto the opposite face of plate 32 there are superposed three gratings 33, 34, 35 insulated from each other, having transfer pulses applied thereto through driving lines 36, 37, 38 in order to cause the charges to be transferred along each detection line. As usual for a 3-phase drive, the pulses are applied to lines 36, 37, 38 with a relative 120° phase shift. The ends $L_1, L_2, \ldots L_N$ of the detection lines have to be connected to multiplexing means (not shown) for providing a multiplexed output signal on an output signal line. The multiplexing means may be realized in various embodiments. One advantageous embodiment is depicted in FIG. 3 as integrated with the detector means of FIG. 2. In FIG. 3 the same reference numerals as in FIG. 2 identify the same elements. Thus the sensor is comprised of an array of CCD's 32 together with driving means 33, 34, 35, 36, 37, 38. A further CCD 42 is connected to the ends of the detection lines and extends transversally to the direction of these lines. The CCD 42 has driving means sections 43, 44, 45 together with driving lines 46, 47, 48 associated therewith for transferring the integrated charges at the ends of the detection lines in multiplex sequence on the unique output line $L_M$. When it is desired that the output signal be time multiplexed, some delay means can be associated with each sensor means, e.g. in the form of an additional CCD (not shown) for delaying the signal for a predetermined time interval.

Figure 4:
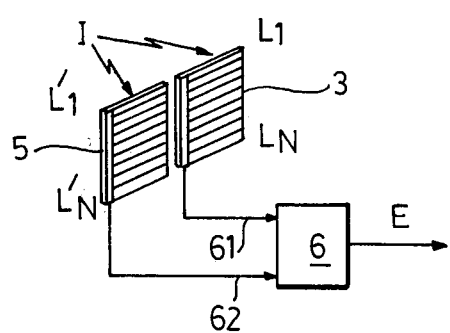
FIG. 4 is a diagrammatic, illustration of an optional arrangement to be used with the embodiment of FIG. 2 for providing continuous control of the optical scanning speed and the transfer speed of the signal from one detector element to the following detector element.

FIG. 4 shows diagramatically an arrangement which provides continuous control of the optical scanning speed and the transfer speed from one detector element to the following detector element. In this arrangement, a second sensor 5 is placed adjacent and coplanar with the first sensor 3 in the image plane. Radiation I, incident on sensors 3 and 5, results in the generation of output signals at the ends $L_1$ to $L_N$ and $L_1'$ to $L_N'$ of the detection lines of sensors 3 and 5, respectively. These signals are coupled by leads 61 and 62 to a correlator 6 which generates a difference signal E that can be used to control the angular deviation between the direction of the detection lines and the direction of the apparent displacement of the image point in the image plane. The difference signal adjusts the scanning speed of the scanning mirror and the transfer speed of the detection signals by regulator means that are well known in the art.

The parameters which govern the operation of the system according to the invention are the orientation of the spin axis of the scanning mirror with respect to the direction of motion of the carrying body, the angular velocity of the scanning mirror, the orientation of the detection lines and the transfer velocity of the detection signal along each detection line. The values of these parameters are chosen such that the image of a point of the viewed scene follows a detection line strictly at the same velocity as the transfer velocity of the detection signal along the detection line.

What is claimed is:

1. An optical observation system for a movable body in space, said system comprising: optical means having a narrow angular field for imaging a viewed scene onto the image plane thereof, said optical means having a plurality of spectral channels and having scanning means such that each image point in said plane is displaced across said image plane in a direction which makes an acute angle with respect to the direction of movement of said movable body;

planar sensor means located in said image plane for generating electric signals proportional to the irradiance, said sensor means comprising a plate with an array of photodetector elements arranged in a plurality of parallel detection lines, said detection lines extending in a direction which is parallel to the direction of said displacement of the image point in the image plane, n gratings insulated from one another and placed parallel to one another and to said plate, said gratings being coupled to successive groups of respective photodetector elements in each detection line, and said gratings being further connected to be fed with recurrent drive pulses for shifting the electric signal from each photodetector element to succeeding ones of them in each detection line at a rate equal to the rate of said displacement of the image point, with the drive pulses for each grating having a phase shift of $360°/n$ relative to the pulses for each of the other gratings;

a second plurality of photodetector elements aligned in a direction perpendicular to the direction lines with each photodetector element in said second plurality of photodetector elements being coupled to the end of a respective one of said detection lines, n second gratings insulated from one another and placed parallel to one another and to said plate, said second gratings being coupled to successive groups of respective photodetector elements in said second plurality of photodetector elements, said second gratings being further connected to be fed with recurrent drive pulses for shifting the electric signal from each of said second photodetector elements to succeeding ones of them, thereby to multiplex the detection signals from the output ends of said detection lines; and reading-out means coupled for sensing the electric signals developed at the output end of each of said detection lines.

2. An optical observation system according to claim 1 wherein said scanning means comprises a mirror rotatable about a spin axis transverse to the plane thereof.

3. An optical observation system according to claim 1, further comprising an additional sensor means associated with the sensor means of any one of said spectral channels of the optical means, said two sensor means being placed in a same plane with their respective detection lines in alignment with each other; correlator means having inputs connected to the outputs of said two sensor means for evaluating the successive signals generated by the corresponding detection lines of said two sensor means and for producing a deviation signal proportional to the angular deviation between the direction of said detection lines and the direction of said apparent displacement of the image point in the image plane, said deviation signal serving to adjust the scanning speed of the scanning mirror means and the transfer speed of the detection signals.

* * * * *